United States Patent
Gummeson et al.

(10) Patent No.: US 10,494,539 B2
(45) Date of Patent: Dec. 3, 2019

(54) CURABLE AMINOPLAST ACRYLIC POLYOL COMPOSITIONS, PROCESS FOR THEIR PREPARATION AND METHODS OF USE

(71) Applicant: INEOS MELAMINES GMBH, Frankfurt am Main (DE)

(72) Inventors: Joel Gummeson, Belchertown, MA (US); William F. Pfohl, Wilbraham, MA (US)

(73) Assignee: INEOS MELAMINES GMBH, Frankfurt am Main (DE)

( * ) Notice: Subject to any disclaimer, the term of this patent is extended or adjusted under 35 U.S.C. 154(b) by 0 days.

(21) Appl. No.: 16/091,087

(22) PCT Filed: Mar. 27, 2017

(86) PCT No.: PCT/EP2017/000369
§ 371 (c)(1),
(2) Date: Oct. 3, 2018

(87) PCT Pub. No.: WO2017/174177
PCT Pub. Date: Oct. 12, 2017

(65) Prior Publication Data
US 2019/0127603 A1  May 2, 2019

(30) Foreign Application Priority Data
Apr. 8, 2016 (EP) .................................. 16000802

(51) Int. Cl.
| | | |
|---|---|---|
| C09D 133/14 | (2006.01) | |
| C09D 5/00 | (2006.01) | |
| C09D 161/32 | (2006.01) | |
| C09D 161/28 | (2006.01) | |
| C08G 12/40 | (2006.01) | |
| C08G 12/32 | (2006.01) | |
| C09D 161/26 | (2006.01) | |

(52) U.S. Cl.
CPC ............. C09D 133/14 (2013.01); C09D 5/00 (2013.01)

(58) Field of Classification Search
CPC .. C09D 161/32; C09D 161/28; C09D 161/26; C09D 133/14; C09D 5/00; C08G 12/40; C08G 12/427; C08G 12/32

USPC ......................................................... 427/384
See application file for complete search history.

(56) References Cited

U.S. PATENT DOCUMENTS

2014/0302241 A1* 10/2014 Lin ..................... C08G 12/32
                                                       427/388.3

FOREIGN PATENT DOCUMENTS

| WO | 01/60882 A1 | 8/2001 |
| WO | 2013/057303 A2 | 4/2013 |
| WO | 2013/154551 A1 | 10/2013 |

OTHER PUBLICATIONS

Chang, T.T., "Characterization of (Methoxymethyl)melamine Resins by Liquid Chromatography/Mass Spectrometry", *Analytical Chemistry* 66, 3267-3272 (1994).
International Search Report for International Application No. PCT/EP2017/000369 filed Mar. 27, 2017 on behalf of Ineos Melamines GMBH, dated Jun. 8, 2017. 3 pages.
Written Opinion for International Application No. PCT/EP2017/000369 filed Mar. 27, 2017 on behalf of Ineos Melamines GMBH, dated Jun. 8, 2017. 6 pages.
International Preliminary Report on Patentability for International Application PCT/EP2017/000369 filed on Mar. 27, 2017 on behalf of Ineos Melamines GMBH, dated Oct. 9, 2018. 7 pages.

* cited by examiner

*Primary Examiner* — Ling Siu Choi
*Assistant Examiner* — Ronald Grinsted
(74) *Attorney, Agent, or Firm* — Steinfl + Bruno LLP

(57) ABSTRACT

A curable aminoplast acrylic polyol composition containing, based on the complete weight of the solids of the composition, (a) 50 to 85% by weight of an acrylic polyol having a glass transition temperature Tg of from 50 to 70° C., an equivalent weight of hydroxyl groups on solids of from 320 to 400, and a hydroxyl number on solids of from 130 to 180 mg KOH/g, (b) 15 to 50% by weight of an alkylated amino formaldehyde resin having a formaldehyde content in accordance with DIN EN ISO 11402 4.3 of less than 0.10%, and the amino compound is melamine, guanamine, benzoguanamine, urea, toluenesulfonamide and glycoluril, containing at least two types of alkyl groups having 1 to 12 carbon atoms, and (c) 0.5 to 5.0% by weight of at least one type of an acidic catalyst, together with a process for preparation of the composition and methods of using the composition.

15 Claims, No Drawings

CURABLE AMINOPLAST ACRYLIC POLYOL COMPOSITIONS, PROCESS FOR THEIR PREPARATION AND METHODS OF USE

CROSS REFERENCE TO RELATED APPLICATIONS

The present application is the U.S. national stage of International Patent Application PCT/EP2017/000369 filed on Mar. 27, 2017 which, in turn, claims priority to European application 16000802.5 filed on Apr. 8, 2016.

FIELD OF THE INVENTION

The present invention relates to curable aminoplast acrylic polyol compositions.

Moreover, the present invention relates to a process for preparing the curable aminoplast acrylic polyol compositions.

Last but not least, the present invention relates to methods of use of the curable aminoplast acrylic polyol compositions.

BACKGROUND OF THE INVENTION

The documents cited in this application are included by reference.

Curable aminoplast acrylic polyol compositions are known in the art from, for example, the international applications WO 2013/057303 A2 or WO 01/60882 A1. The curable compositions can be used for low temperature curing and, in the cured state, can be used for wood coatings, automotive coatings, coil coatings or coatings for appliances. However, they show severe drawbacks when they are used for the coating of concrete, masonry containing concrete and stone work containing concrete. Without wishing to be bound by any theory it is believed that the basic components of concrete which often tend to migrate to the surface neutralize at least partly the acidic catalysts of the curable aminoplast acrylic polyol compositions. In theory, this problem could be circumvented by using comparatively high amounts of acidic catalysts, however, the residues of which remaining in the cured coating affect its overall performance. In addition, the known curable aminoplast acrylic polyol compositions are prone to be soaked into the concrete and, therefore, can no longer fulfill their intended functions. Moreover, the basic components of the concrete can attack the cured coating and cause it to de-polymerize.

It is therefore an object of the invention to provide a curable aminoplast acrylic polyol composition for ambient cure (20-40° C.) which does no longer exhibit the drawback of the prior art. In particular, it should be curing fast so that it is not soaked into the concrete. Additionally, the curable composition should require less acidic catalysts than the prior art so that no problems caused by catalyst residues in the cured coating no longer appear. Most important however, the long-term performance of the cured coating should no longer be affected by the basic components of the concrete.

Other objects will become apparent by the following description.

The object is solved by the curable aminoplast acrylic polyol composition claimed in claim 1. Various advantageous embodiments can be taken from the dependent claims.

DETAILED DESCRIPTION OF THE INVENTION

The curable aminoplast acrylic polyol composition of the present invention contains, based on the complete weight of the solids of the composition, 50 to 85% by weight, preferably 50 to 75% by weight and, most preferably, 55 to 65% by weight of at least one type, preferably one type, of an acrylic polyol.

The acrylic polyol to be used in accordance with the invention has a glass transition temperature Tg of from 50 to 70° C., preferably of from 55 to 65° C. and, most preferably, of from 58 to 65° C.

Moreover, the acrylic polyol to be used in accordance with the invention has an equivalent weight of hydroxyl groups on solids of from 320 to 400, preferably 340 to 380 and, most preferably, 350 to 370.

Additionally, the acrylic polyol to be used in accordance with the invention has a hydroxyl number on solids of from 130 to 180 mg/g, preferably 140 to 170 mg/g and, preferably 145 to 165 mg/g.

Additionally, the acrylic polyol to be used in accordance with the invention has a molecular weight (Mw) of 6,000-22,000 Dalton, preferably 8,000-20,000 Dalton and most preferably 10,000-17,000 Dalton.

Acrylic polyols to be used in accordance with the invention are known in the art and are commercially available. Examples of suitable acrylic polyols are Joncryl™ 581 and 582, both products being marketed by BASF SE and BASF Corporation.

The curable aminoplast acrylic polyol composition of the present invention contains, based on the complete weight of the solids of the composition, 15 to 50% by weight, preferably 25 to 50% by weight and, most preferably 35 to 45% by weight of at least one type, preferably one type, of an alkylated amino formaldehyde resin.

The alkylated amino formaldehyde resin to be used in accordance with the invention has a free formaldehyde content in accordance with DIN EN ISO 11402 4.3 Sulphite Method of less than 0.10%, preferably less than 0.06% and, most preferably, less than 0.03%.

The amino compound on which at least one type, preferably one type, of the alkylated amino formaldehyde resin is based is being selected from the group consisting of melamine, guanamine, benzoguanamine, urea, toluenesulfonamide and glycoluril, containing at least one type, preferably at least two types of alkyl groups having 1 to 12 carbon atoms.

The amino compound on which at least one type of the alkylated amino formaldehyde resin is based is in particular melamine. The alkyl groups having 1 to 12 carbon atoms are selected from the group consisting of methyl, ethyl, propyl, isopropyl, n-butyl, isobutyl, secondary butyl, tertiary butyl, amyl, hexyl, heptyl, octyl, nonyl, decyl, cyclopentyl, cyclohexyl, methyl cyclohexyl, trimethyl cyclohexyl, furfuryl, benzyl, methyl benzyl and diacetone-1-yl groups, in particular, methyl, n-butyl and isobutyl groups, the n-butyl and isobutyl groups being jointly referred to hereinafter as "butyl groups".

Most preferably, at least one type of the alkylated amino formaldehyde resin contains methyl and butyl groups.

The alkylated melamine formaldehyde resin to be used in accordance with the invention has a ratio of the sum of hexa-alkoxy methyl melamine to penta-methoxy methyl melamine as determined by HPLC according T. T Chang, Anal. Chem, 66, 3267-3272 (1994) from 20 to 50, preferably 25 to 45, and most preferably from 30 to 40.

An example of a particularly suitable alkylated amino formaldehyde resin is a melamine formaldehyde resin co-etherified with methyl and butyl groups in a ratio of 90/10.

The alkylated amino formaldehyde resins to be used in accordance with the invention are known in the art and are commercially available. An example of a suitable alkylated amino formaldehyde resin is Resimene™ CE 7103 which is available from INEOS Melamines.

The curable aminoplast acrylic polyol composition of the invention furthermore contains, based on the complete weight of the solids of the composition and the weight of the solids of the catalyst, 0.5 to 5.0% by weight, preferably 1 to 4.0% by weight and, most preferably, 1.5 to 2.5% by weight of at least one type, preferably one type, of an acidic catalyst.

The acidic catalysts are known in the art and are commercially available. Suitable acidic catalysts are listed, for example in Johan Bielemann, Lackadditive, WILEY-VCH, 1998, page 247.

According to the present invention, the curable aminoplast acrylic polyol composition is prepared by dissolving the components hereinbefore described in the desired amounts in at least one organic solvent, followed by homogenizing the resulting mixture to yield a liquid curable aminoplast acrylic polyol composition.

The preparation of the liquid curable aminoplast acrylic polyol composition offers no technical particularities so that mixing appliances well known in the art can be used.

The organic solvent can be an aprotic solvent or a protic solvent. The presence of an alcohol has positive effects in regard of increasing the coating mixture's potlife. Therefore, a mixture of aprotic and protic organic solvents is preferably used.

Suitable protic organic solvents are selected from the group consisting of methanol, ethanol, propanol, isopropanol, n-butanol, isobutanol, secondary butanol tertiary butanol, amyl alcohols, hexanols, heptanols, octanols, nonanols, decanols, cyclopentanol, cyclohexanol, methylcyclohexanols, trimethylcyclohexanols, furfurylalcohol, benzyl alcohol, methylbenzyl alcohol and diacetone alcohol. Most preferably the monoalcohol is selected from methanol, n-butanol and isobutanol, n-butanol and isobutanol being preferably used.

Preferably, the aprotic solvent is selected from the group consisting of alkanes, cycloaliphatic hydrocarbons, terpene hydrocarbons and terpenoids, aromatic hydrocarbons, chlorinated hydrocarbons, ketones, esters, ethers, glycol ethers, dimethyl carbonate, N,N-dimethylformamide, N,N-dimethylacetamide, N-methylpyrrolidone, hexamethyl phosphoric triamide, dimethyl sulfoxide, tetramethylene sulfone and 1,3-dimethyl-2-imidazolidinone.

Preferably, the alkanes are selected from the isomeric pentanes, isomeric hexanes, isomeric heptanes, isomeric octanes, isomeric nonanes and isomeric decanes; the cycloaliphatic hydrocarbons are selected from the group consisting of cyclohexane, methyl cyclohexane, tetralin and decalin; the terpene hydrocarbons and terpenoids are selected from the group consisting of turpentine oil, root turpentine oil, wood oil, pine oil and terpineol; the aromatic hydrocarbons are selected from the group consisting of toluene, xylene, ethylbenzene and cumene; the chlorinated hydrocarbons are selected from the group consisting of dichloromethane, trichloromethane, tetrachloromethane, 1,2-dichloroethane, 1,1,2,2-tetrachloroethane, 1,1,1-trichloroethane, 1,2-dichloroethylene, trichloroethylene, perchloroethylene, 1,2-dichloropropane and chlorobenzene; the ketones are selected from the group consisting of acetone, methyl ethyl ketone, methyl propyl ketone, methyl isopropyl ketone, methyl butyl ketone, methyl isobutyl ketone, methyl amyl ketone, ethyl amyl ketone, diisopropyl ketone, dipropyl ketone, diisobutyl ketone, mesityl oxide, cyclohexanone, methyl cyclohexanone, dimethyl cyclohexanone, trimethyl cyclohexanone and isophorone; the esters are selected from the group consisting of methyl formate, ethyl formate, butyl formate, isobutyl formate, methyl acetate, ethyl acetate, propyl acetate, butyl acetate, isobutyl acetate, secondary butyl acetate, amyl acetate, 2-ethylhexyl acetate, octyl acetate, nonyl acetate, hexyl acetate, cyclohexyl acetate, benzyl acetate, methyl glycol acetate, ethyl glycol acetate, butyl glycol acetate, ethyl diglycol acetate, butyl diglycol acetate, 1-methoxy propyl acetate, 2-methoxy propyl acetate, ethoxypropyl acetate, 3-methoxy butyl acetate, ethyl 3-ethoxy propionate, butyl butyrate, butyl isobutyrate, ethyl lactate, butyl lactate, butyl glycolate, dimethyl adipate, dimethyl glutarate, dimethyl succinate, ethylene carbonate, propene carbonates and butyrolactone; the ethers are selected from the group consisting of diethyl ether, diisopropyl ether, dibutyl ether, methyl tertiary butyl ether, tetrahydrofurane, 1,4-dioxane and metadioxane; the glycol ethers are selected from the group consisting of diethylene glycol dimethyl ether, diethylene glycol diethyl ether and diethylene glycol dipropyl ether.

Most preferably, the aprotic solvent is dimethyl carbonate.

The ratio of aprotic solvent/protic solvent can vary broadly and, therefore, can be adapted most advantageously to the peculiarities of a given composition. Preferably, the ratio is from 10:1 to 1:1, more preferably 8:1 to 2:1 and, most preferably, 6:1 to 3:1.

Preferably, the liquid curable aminoplast acrylic polyol composition is prepared in such a way that it solids content, based on the complete weight of the composition, is from 30 to 80% by weight, preferably 35 to 70% by weight, and most preferably 40 to 60% by weight.

The following examples are set forth as representative of the present invention. These examples are not to be construed as limiting the scope of the invention as these and other equivalent embodiments will be apparent in view of the present disclosure and the appended claims.

According to the invention, the liquid curable aminoplast acrylic polyol compositions can be applied by known techniques such as spraying, brushing or curtain coating. They can be cured at ambient temperatures, i.e. temperatures between 0 and 40° C. Nevertheless, they have a long potlife. They can be used for coating glass, metal, wood, textiles such as convertible tops, plastics, concrete, concrete stones, asphalt, concrete, brick, roof tiles, masonry and tarmac. In all these applications they offer also economically important anti-graffiti properties. The produced coatings are distinguished by their chemical resistance and adhesion between several coating layers. The concrete coatings perform excellent in the hot tire pick-up test.

EXAMPLES

Example 1

Use of the Liquid Curable Aminoplast Acrylic Polyol Composition 1 of the Invention A liquid curable amino plastic acrylic polyol composition was prepared by dissolving and homogenizing 58.6 parts by weight corresponding to 58.6% by weight of Joncryl™ 582, 39.1 parts by weight corresponding to 39.1% by weight Resimene™ CE 7103 (weight ratio 60/40) in 85 parts by weight dimethyl carbonate and 20 parts by weight of butanol. 5.68 parts by weight of the acidic catalyst King K-Cure™ 1040 corresponding to 2.27% by weight of solid catalyst were added to the mixture, the weight percentages being based on the complete weight of the solids.

The curable composition was applied on unsealed concrete surfaces and cured at 25° C. A clear film was obtained which withstood more than 200 MEK rubs after 24 hours.

The cured film was hot tire pickup resistant on tarmac, solvent and automotive fluid resistant, resistant to Skydrol™ LD-4, has an excellent adhesion as a two-coat system and will provide a "wet" appearance for years. It could also be used as anti-graffiti coating.

Example 2

Use of the Liquid Curable Amino Plastic Acrylic Polyol Composition 2 of the Invention Example 1 was repeated only that Joncryl™ 581 was used as acrylic polyol.

The same advantageous results were obtained.

What is claimed is:

1. Curable aminoplast acrylic polyol composition containing, based on the total weight of the solids of the composition,
   (a) 50 to 85% by weight of at least one type of an acrylic polyol having a glass transition temperature Tg of from 50 to 70° C., an equivalent weight of hydroxyl groups on solids of from 320 to 400, a hydroxyl number on solids of from 130 to 180 mg KOH/g, and a weight average molecular weight (Mw) of 6,000-22,000 Dalton,
   (b) 15 to 50% by weight of at least one type of an alkylated amino formaldehyde resin having a formaldehyde content in accordance with DIN EN ISO 11402 4.3 of less than 0.10%, the amino compound on which at least one type of the alkylated amino formaldehyde resin is based is being selected from the group consisting of melamine, guanamine, benzoguanamine, urea, toluenesulfonamide and glycoluril, and the alkylated amino formaldehyde resin containing at least one type of alkyl groups having 1 to 12 carbon atoms, and the alkylated melamine formaldehyde resin having a ratio of the sum of hexa-alkoxy methyl melamine to the sum of penta-methoxy methyl melamine as determined by HPLC from 20 to 50, and
   (c) 0.5 to 5.0% by weight of at least one type of an acidic catalyst.

2. The curable aminoplast acrylic polyol composition according to claim 1, containing, based on the total weight of the solids of the composition,
   (a) 50 to 75% by weight of the at least one type of an acrylic polyol.

3. The curable aminoplast acrylic polyol composition according to claim 1, wherein the glass transition temperature Tg of the acrylic polyol is of from 55 to 65° C.

4. The curable aminoplast acrylic polyol composition according to claim 1, wherein the equivalent weight of hydroxyl groups on solids of the acrylic polyol is from 340 to 380.

5. The curable aminoplast acrylic polyol composition according to claim 1, wherein the hydroxyl number on solids of the acrylic polyol is from 140 to 170 mg KOH/g.

6. The curable aminoplast acrylic polyol composition according to claim 1, containing, based on the total weight of the solids of the composition,
   (b) 30 to 50% by weight of at least one type of an alkylated amino formaldehyde resin.

7. The curable aminoplast acrylic polyol composition according to claim 1, wherein the alkylated amino formaldehyde resin has a free formaldehyde content in accordance with DIN EN ISO 11402 4.3 of less than 0.05%.

8. The curable aminoplast acrylic polyol composition according to claim 1, wherein the amino compound on which at least one type of the alkylated amino formaldehyde resin is based is melamine.

9. The curable aminoplast acrylic polyol composition according to claim 1, wherein the alkyl groups of the alkylated amino formaldehyde resin are having 1 to 12 carbon atoms and are selected from the group consisting of methyl, ethyl, propyl, isopropyl, n-butyl, isobutyl, secondary butyl, tertiary butyl, amyl, hexyl, heptyl, octyl, nonyl, decyl, cyclopentyl, cyclohexyl, methyl cyclohexyl, trimethyl cyclohexyl, furfuryl, benzyl, methyl benzyl and diacetone-1-yl groups.

10. The curable aminoplast acrylic polyol composition according to claim 9, wherein the alkyl groups are methyl, n-butyl and isobutyl groups.

11. A process for preparing the curable aminoplast acrylic polyol composition according to claim 1 by
   (1) dissolving the components (a), (b) and (c) in the desired amounts in at least one organic solvent and
   (2) homogenizing the resulting mixture to yield a liquid curable aminoplast acrylic polyol composition.

12. The process according to claim 11, wherein the liquid curable aminoplast acrylic polyol composition is having a solids content of from 30 to 80% by weight, based on the total weight of the composition.

13. A method of using the curable aminoplast acrylic polyol composition in accordance with claim 1 and a liquid curable aminoplast acrylic polyol composition prepared by
   (1) dissolving the components (a), (b) and (c) in the desired amounts in at least one organic solvent and
   (2) homogenizing the resulting mixture to yield a liquid curable aminoplast acrylic polyol composition,
wherein the composition is applied on a solid surface and cured to yield a solid coating.

14. The method of using according to claim 13, wherein the solid surface is glass, metal, wood, textiles, plastics, concrete, concrete stones, asphalt concrete, brick, roof tile, masonry and tarmac.

15. The method of use according to claim 14, wherein the solid surface is concrete.

* * * * *